United States Patent [19]
Seeber et al.

[11] 3,880,092
[45] Apr. 29, 1975

[54] RIGID FOAMED PLASTIC PALLET

[75] Inventors: Howard Arthur Seeber, Larkspur, Colo.; Joseph Marchisen, Heightstown; Edward John Brozena, Branchburg, both of N.J.

[73] Assignee: Johns-Manville Corporation, New York, N.Y.

[22] Filed: July 21, 1972

[21] Appl. No.: 273,906

[52] U.S. Cl. ................. 108/55; 108/51; 264/45
[51] Int. Cl. ................. B65d 19/44; B65d 19/00
[58] Field of Search ................. 108/51–58, 108/161; 297/445, DIG. 2; 206/46 FC; 264/45

[56] References Cited
UNITED STATES PATENTS

| | | | |
|---|---|---|---|
| 2,582,228 | 1/1952 | Brinkema | 264/45 |
| 2,838,100 | 6/1958 | Follows | 297/DIG. 2 |
| 3,131,655 | 5/1964 | Sellers et al. | 108/51 |
| 3,187,689 | 6/1965 | Hess | 108/58 |
| 3,511,191 | 5/1970 | Barry et al. | 108/58 |
| 3,557,512 | 7/1968 | Breauninger et al. | 108/51 |
| 3,669,495 | 6/1972 | Rudgisch | 297/445 |
| 3,677,200 | 7/1972 | Coccogna | 108/58 |
| 3,710,733 | 1/1973 | Story | 108/51 |

*Primary Examiner*—Paul R. Gilliam
*Assistant Examiner*—G. O. Finch
*Attorney, Agent, or Firm*—Robert M. Krone; James W. McClain

[57] ABSTRACT

A rigid foamed plastic pallet comprises a deck and a series of runners which are integral with and depend from the lower surface of the deck. The pallet is strengthened by reinforcing members which are located in the deck and in the runners of the pallet. The pallet is formed by constructing a frame of reinforcing members, placing the assembled frame in a mold, depositing foamed plastic in the mold and allowing the foamed plastic to harden.

3 Claims, 6 Drawing Figures

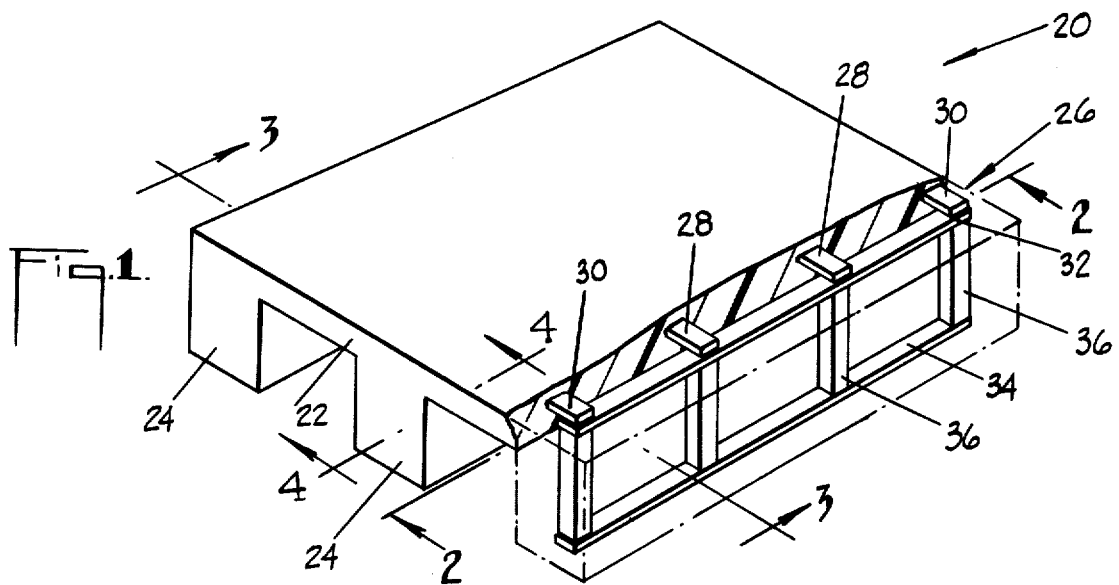
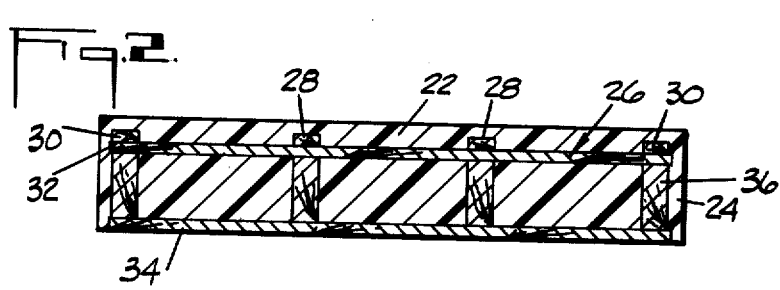
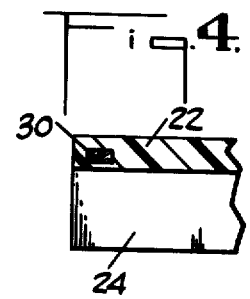
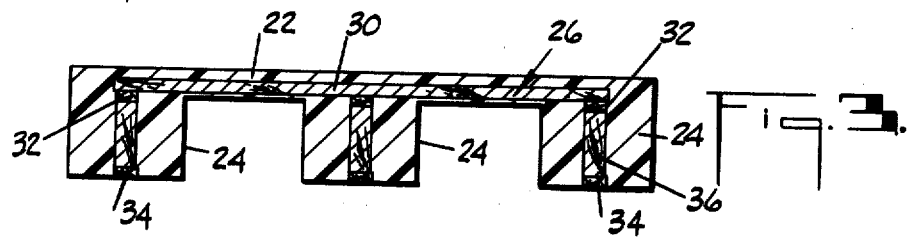
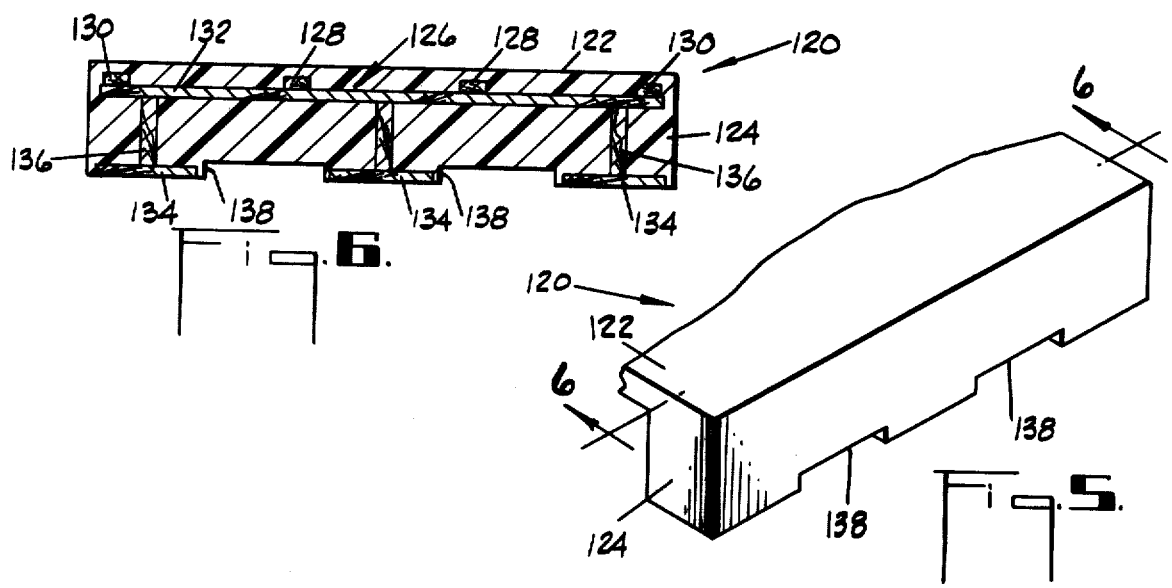

RIGID FOAMED PLASTIC PALLET

BACKGROUND OF THE INVENTION

The present invention relates to a rigid foamed plastic pallet and, in particular, to a reinforced pallet which is provided with a reinforcing frame constructed to prevent the ends of the pallet deck and the pallet runners from being fractured.

The use of foamed plastic pallets such as polystyrene pallets in the materials-handling industry is not new. However, the polystyrene pallets of the prior art do not have the flexural rigidity and the compression resistance to adequately handle dynamic loads in excess of 2,000 pounds or static loads in excess of 4,000 pounds. In addition, the deck ends of these pallets are frequently damaged or fractured when straps are passed around the ends to retain loads on the pallets and the runners are often damaged or fractured when the pallets are placed on racks.

SUMMARY OF THE INVENTION

Consequently, it is an object of the present invention to provide a rigid foamed plastic pallet capable of withstanding dynamic loads in excess of 4,000 pounds and static loads in excess of 7,000 pounds.

It is a further object of the invention to provide a pallet which is constructed to prevent the deck ends and runners from fracturing.

Accordingly, the present invention provides a rigid foamed plastic pallet comprising a deck and a series of runners which are integral with and depend from the underside of the deck. The pallet is strengthened by means of a reinforcing frame which is molded into the pallet. Reinforcing members of the frame are embedded in and extend along each end of the deck. While these members are preferably enclosed within the foamed plastic to prevent the members from becoming separated from the deck, the reinforcing members are placed as close as possible to the underside and end of the deck. Thus, they effectively form the lower edges of the deck ends. To strengthen the pallet and distribute the stresses in the runners, reinforcing members are also provided at the lower extremity of the runners. These members run longitudinally with respect to the runners and help distribute the stresses transmitted to the polystyrene along the length of the runners when the runners are supported on racks and the like. Otherwise, stress concentrations at the points of support would fracture the polystyrene under heavy loading. As with the reinforcing members at the ends of the deck, the reinforcing members extending in the runners are located as close as practical to the lower surface of the runners and, in face, generally have one surface exposed on the underside of the runners.

BRIEF DESCRIPTION OF THE DRAWINGS

FIG. 1 is a perspective view of a pallet with portions broken away to better illustrate the reinforcing frame utilized in the present invention;

FIG. 2 is a sectional view taken substantially along lines 2—2 of FIG. 1 to illustrate the reinforcing frame structure within the pallet;

FIG. 3 is a sectional view taken substantially along line 3—3 of FIG. 1 to illustrate the reinforcing frame of the present invention;

FIG. 4 is a fragmentary sectional view taken substantially along line 4—4 of FIG. 1 to better illustrate the preferred location of the reinforcing member at the end of the deck;

FIG. 5 is a fragmentary perspective view of another embodiment of the present invention having recesses in the runners to permit the insertion of forks of forklift trucks; and FIG. 6 is a sectional view taken substantially along line 6—6 of FIG. 5 to illustrate the reinforcing frame structure used with the pallet of FIG. 5.

DETAILED DESCRIPTION OF THE INVENTION

The pallet 20, as illustrated in FIG. 1, comprises a deck 22 with depending runners 24. The pallet is made of a rigid foamed plastic such as polystyrene, and is provided with a reinforcing frame generally designated by reference character 26. The frame is made up of elongate transverse frame members 28 and 30 plus upper and lower elongate longitudinal frame members 32 and 34 respectively. The frame members are made of wood, metal, plastic or other suitable materials capable of withstanding high stresses without fracturing or being cracked.

The intermediate transverse frame members 28 rest upon the longitudinal reinforcing members 32. While only two intermediate members 28 are shown, the number and spacing of these members can vary as required to provide the necessary reinforcement in the deck of the pallet. In addition to the intermediate transverse members 28, the reinforcing frame 26 is provided with a pair of transverse frame members 30 which also rest on the longitudinal reinforcing members 32 and are located at each end of the deck 22. Each of these members is preferably completely embedded in the deck with one surface of the member adjacent an underside of the deck and another surface adjacent the end wall of the deck. Frame members 30 are completely embedded within the foamed plastic to assure that the members will not become separated from the pallet. However, since one of the functions of these members is to prevent the fracturing of the deck ends, they are placed as close to the underside (within about ¼ inch) and end walls (within about ½ inch) of the deck as possible. In fact, under some conditions, the members could be partially embedded within the deck with surfaces exposed on the end walls and/or the underside. As a result, the transverse reinforcing members 30 at the ends of the frame assembly essentially form the lower edges of the pallet deck at the ends of the pallet for the entire lengths or substantially the entire lengths of the pallet end walls. In this way, the transverse reinforcing members 30 at each end of the pallet 20 not only serve to strengthen the deck 22 but, in addition, they provide the deck ends with lower edges which can withstand the stresses exerted by load holding straps without fracturing when the pallet load is held on the pallet by straps. Thus, fracturing of the pallet ends, due to the strapping of a load on the pallet, is eliminated by means of the reinforcing members 30.

The upper longitudinal reinforcing members 32 are connected to the lower longitudinally extending reinforcing members 34 by vertically extending struts 36. While there may be more upper longitudinal reinforcing members, at least one upper longitudinal reinforcing member 32 is provided for each runner having a lower longitudinal reinforcing member 34. As with the transverse reinforcing members 28, the number and spacing of the upper longitudinal reinforcing members 32 can be varied as required to provide the necessary reinforcement for the pallet.

The lower reinforcing members 34 are located at the lower extremity of each runner 24. Preferably, the lower reinforcing members 34 are centrally located in the lower surface of the runners and they extend the entire length of the runners. The lower surface of each reinforcing member 34 is flush with the lower surface of the runner or substantially flush with the lower surface of the runner. With this placement of the reinforcing members 34, forces are transmitted from a supporting surface to the foamed plastic portions of the runners through the reinforcing members 34. Consequently, when the pallet is only supported on members extending transversely with respect to the pallet at each end of the pallet, the forces transmitted to the foamed plastic are distributed along the length of the reinforcing members 34 rather than being concentrated at the actual points of support for the pallet. Since pallets are frequently placed on storage racks which only provide support adjacent each end of the pallet, such reinforcing members are required to distribute large forces transmitted to the foamed plastic which would fracture or crush the foamed plastic if concentrated at the actual area of support.

FIGS. 5 and 6 disclose a somewhat modified form of the pallet of the present invention. Pallet 120 comprises a deck 122 having a plurality of runners 124 depending therefrom. The pallet is made of rigid foamed plastic and provided with a reinforcing frame generally designated by reference character 126. The frame comprises elongate transverse reinforcing members 128 and 130 plus upper longitudinally extending elongate reinforcing members 132 and lower longitudinally extending elongate reinforcing members 134 which are connected to the upper longitudinal reinforcing members by struts 136.

The pallets of the second embodiment are identical to the pallets of the first embodiment with the exception that the runners 124 are provided with pairs of recesses in their lower surfaces for receiving the forks of forklift trucks. As a result of the recesses 138, the lower longitudinally extending reinforcing members 134 are divided into three segments with at least one strut 136 extending from each segment to the upper longitudinally extending reinforcing members 132. The transverse reinforcing members 130 at each end of the pallet serve the same function as transverse reinforcing members 30, and the longitudinally extending reinforcing members 134 serve the same function as reinforcing members 34 of the first embodiment.

A typical pallet, made in accordance with the present invention, has an upper deck 22 ranging from 36 to 52 inches in length by 36 to 44 inches in width. The deck has a thickness ranging from 1¼ to 1½ inches. The runner heights typically range from 3¾ to 4¾ inches by about 5¾ inches in width. The length of the runner is anywhere from the same length as the deck to a few inches shorter than the deck. The pallets are formed by first assembling a reinforcing frame 26 or 126. This is done by taking the appropriate number of transverse and longitudinal reinforcing members (typically ¾ to 1 inch square) and adhesively bonding or otherwise securing the members together. After the reinforcing frame has been assembled, it is placed in a mold and a foamed plastic such as polystyrene is introduced into the mold. The foamed plastic is allowed to harden and then the finished pallet is removed from the mold and is ready for use.

What we claim is:

1. A rigid foamed plastic pallet comprising:
   a. a deck, said deck having an upper surface and a lower surface, and said deck having end walls and side walls extending between said upper and lower surfaces,
   b. runners integral with said deck, said runners projecting downward from the lower surface of said deck and extending generally parallel with respect to said side walls of said deck, and
   c. elongate reinforcing members comprising wood and extending along said end walls and being embedded in said deck, with each of said reinforcing members reinforcing at least part of a lower edge of one of said end walls and having a first longitudinal surface adjacent and parallel to the lower surface of said deck and a second longitudinal surface adjacent and parallel to one of the end walls of said deck;
   d. at least some of said runners having pairs of recesses in their undersides for receiving forks of a forklift truck; and
   e. at least some of said runners also being provided with elongated reinforcing members, comprising wood, said reinforcing members being embedded in an underside of said runners, said reinforcing members extending longitudinally with respect to said runners, and said reinforcing members each having a longitudinal surface at said underside of one of said runners.

2. The rigid foamed plastic pallet of claim 1 wherein each of said elongate reinforcing members has a first longitudinal surface at least partially exposed on said lower surface of said deck and a second longitudinal surface at least partially exposed on one of said end walls of said deck.

3. The rigid foamed plastic pallet of claim 1 wherein said longitudinal surfaces of said reinforcing members of said runners are exposed.

* * * * *